US006725806B1

(12) United States Patent
Gribble

(10) Patent No.: US 6,725,806 B1
(45) Date of Patent: Apr. 27, 2004

(54) INSULATED PET DOOR

(75) Inventor: Stuart W. Gribble, Wichita, KS (US)

(73) Assignee: Jaycat, Inc., Wichita, KS (US)

( * ) Notice: Subject to any disclaimer, the term of this patent is extended or adjusted under 35 U.S.C. 154(b) by 0 days.

(21) Appl. No.: 09/432,862

(22) Filed: Nov. 2, 1999

(51) Int. Cl.[7] .......................... A01K 1/03; A01K 1/035
(52) U.S. Cl. ...................................................... 119/484
(58) Field of Search ................................ 119/484, 481, 119/501; D30/108, 119

(56) References Cited

U.S. PATENT DOCUMENTS 2,748,854 A * 6/1956 Lynch
3,690,299 A * 9/1972 Johnson ......................... 119/1
4,043,079 A * 8/1977 Smith .......................... 49/394
4,173,099 A * 11/1979 Robb .......................... 49/168
4,255,902 A * 3/1981 Ruff ............................ 49/488
4,421,058 A * 12/1983 Paul ............................ 119/19
5,651,331 A * 7/1997 Cleri, Jr. ..................... 119/484
5,992,096 A * 11/1999 De La Cerda et al. ....... 49/169

* cited by examiner

*Primary Examiner*—Charles T. Jordan
*Assistant Examiner*—Kimberly S. Smith
(74) *Attorney, Agent, or Firm*—Fredrikson & Byron, P.A.

(57) ABSTRACT

A pet door for installation in an opening through a dwelling barrier with a frame having a rectangular portal therethrough in which an insulated movable closure is suspended to swingingly pivot intermediate the top edge and lateral midline of the closure. A resiliently flexible seal is mounted around the entire perimeter of the closure to sealably engage the rectangular portal of the frame. A selectively operable latch is carried on the closure to restrict movement of the closure within the portal of the frame.

5 Claims, 3 Drawing Sheets

INSULATED PET DOOR

BACKGROUND OF THE INVENTION

This invention relates to a pet door for installation in an outside wall or door of a dwelling. More specifically, this invention relates to an insulated pet door which is pivotally sealable to minimize environmental heat transfer.

Various pet door constructions are known and are commercially available for installation in a variety of dwelling barriers. The barest essential simply requires a hinged or flexible flap over an opening in the dwelling barrier. However, since the pet door must swing in both directions to permit ingress and egress of the animal, sealing the door against the barrier to exclude insects and environmental conditions has proven to be problematic.

A popular and widely used commercial pet door includes a frame with a rectangular opening secured to the dwelling wall or exterior door. A flexible first flap sized slightly larger in both width and length than the rectangular opening through the frame is connected along its upper edge on one side of the frame. The first flap itself has a rectangular opening therethrough sized sufficiently large to accommodate a pet but smaller in width and length than the rectangular opening through the frame. A flexible second flap, sized slightly larger in both width and length than the rectangular opening through the first flap and slightly smaller in both width and length than the rectangular opening through the frame, is connected along its upper edge to either the frame or the first flap.

Constructed in the foregoing fashion, the commercial prior art pet door functions in the following manner. When traveling in one direction, the pet moves the first and second flaps in tandem away from the frame in order to pass through the rectangular opening of the frame. When traveling in the opposite direction, however, the pet moves only the second flap away from the first flap and the frame in order to pass through the rectangular opening in the first flap, as well as the rectangular opening in the frame.

Both the first and second flaps return to a vertically suspended orientation when not accommodating the comings and goings of a pet. Magnets have been utilized to improve the sealing characteristics of the first and second flaps. Typically, one set of magnets is strategically mounted to fasten the first flap to the frame and a second set of magnets is strategically mounted to fasten the second flap to the first flap. When the owner wishes to restrict pet travel through the pet door, a removable panel may be temporarily secured to the frame in order to block the rectangular opening through the frame and to prevent the swinging movement of the first and second flaps.

In spite of the foregoing features, the prior art pet doors are only partially effective in excluding outside environmental conditions. Frequently, the magnets or other sealing measures are unable to maintain sealing engagement during inclement weather or even when a large temperature differential exists between the dwelling and the outside. For example, during winter conditions, cold air blows the pet door inwardly to enter a warm house and, during summer conditions, cool air provided in an air conditioned home blows the pet door open to escape to the warmer outdoors environment. Even when the pet door remains closed to prevent the direct migration of outside air to the inside or visa versa, the pet door still permits virtually unrestricted heat transfer conducted through the flaps of the product. In other words, cold drafts during the winter and warm drafts during the summer around pet doors are commonplace.

The need remains in the pet industry for a reliable pet door to seal an opening in a dwelling barrier to minimize convective and conductive heat transfer. The primary objective of this invention is to meet this need.

SUMMARY OF THE INVENTION

More specifically, an object of the invention is to provide a pet door of quality construction having an insulated closure to minimize heat transfer by conduction therethrough.

Another object of the invention is to provide a pet door of quality construction with a movable closure that positively and effectively seals around the entire perimeter thereof to minimize convective heat transfer.

Yet another object of the invention is to provide a pet door of the character previously described which includes a integrally connected latch mechanism to restrict pet use of the movable closure.

An additional object of the invention is to provide a pet door of the character previously described which may be readily installed in a dwelling barrier such as a door or wall.

A further object of the invention is to provide a pet door of the character previously described which may be installed in a dwelling barrier and which may be adapted to a wide variety of thicknesses of such barrier.

In summary, a pet door for installation in an opening through a dwelling barrier with a frame having a rectangular portal therethrough in which an insulated movable closure is suspended to swingingly pivot intermediate the top edge and lateral midline of the closure. A resiliently flexible seal is mounted around the entire perimeter of the closure to sealably engage the rectangular portal of the frame. A selectively operable latch is carried on the closure to restrict movement of the closure within the portal of the frame.

Other and further objects of the invention, together with the features of novelty appurtenant thereto, will appear in the description of the drawings.

BRIEF DESCRIPTION OF THE DRAWINGS

In the following description of the drawings, in which like reference numerals are employed to indicate like parts in the various views.

DETAILED DESCRIPTION OF THE DRAWINGS

Figure 1:
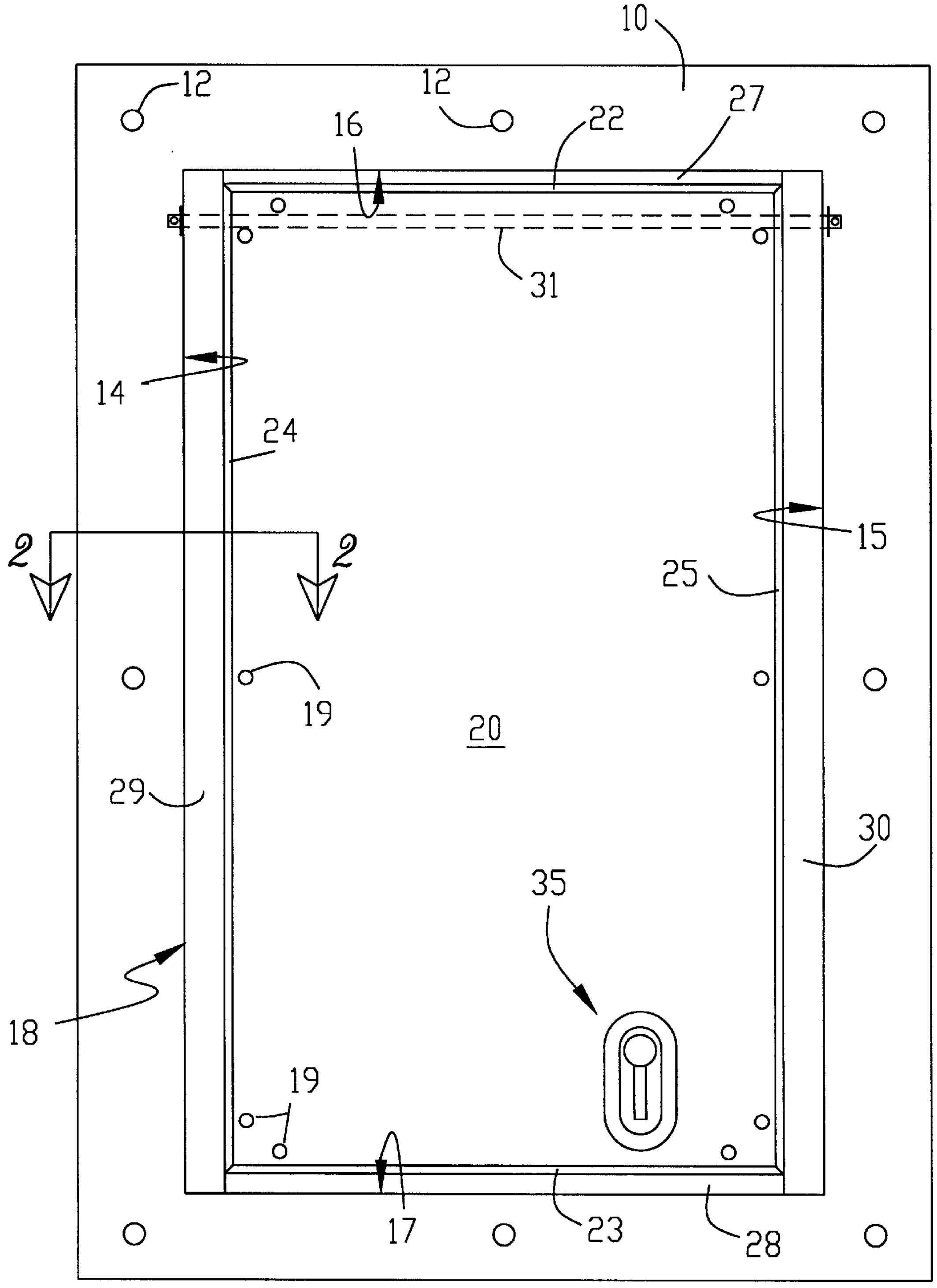
FIG. 1 is a front elevational view of an insulated pet door constructed in accordance with a preferred embodiment of my invention.
Figure 3:
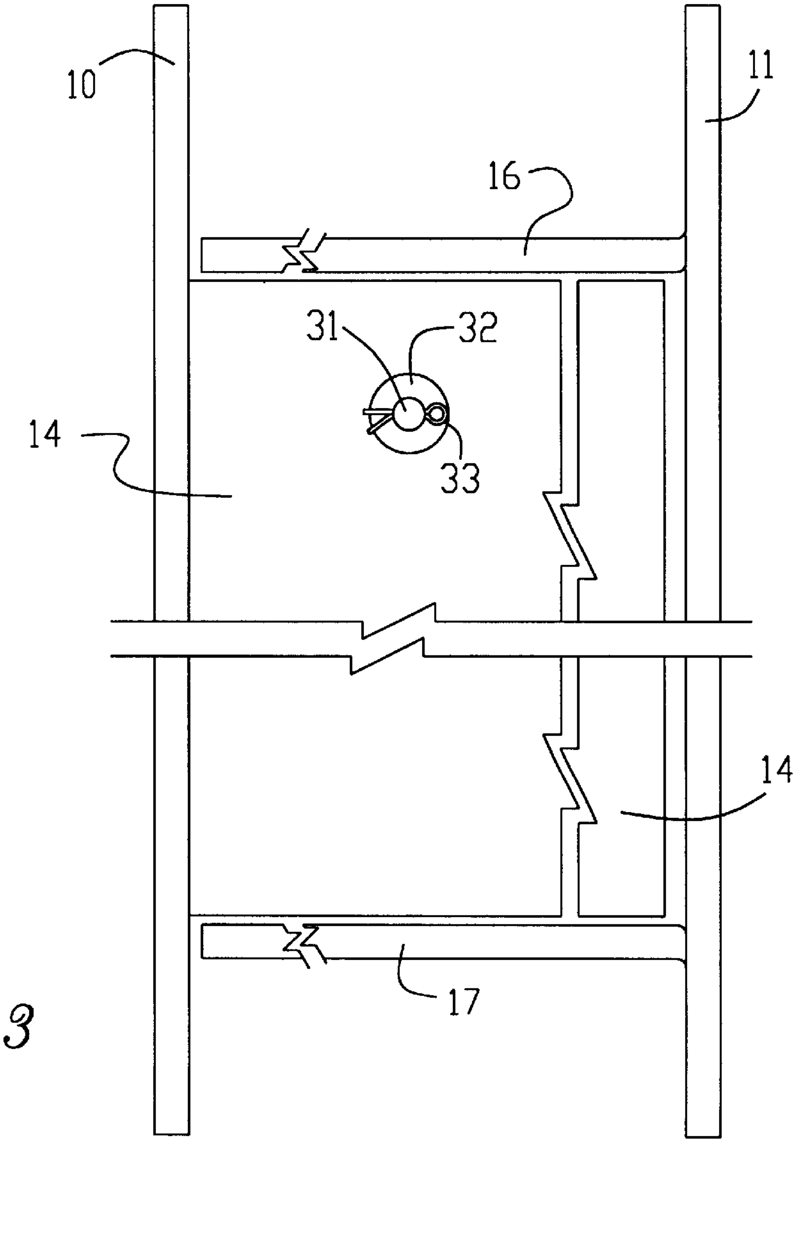
FIG. 3 is a side elevational view of the upper and lower ends of the pet door with interrupt lines indicating variable length and breadth of the members illustrated.

Referring to the drawings in greater detail, attention is first directed to FIGS. 1 & 3. The pet door includes first and second frame borders 10 & 11, each having an interior rectangular opening, to be mounted on opposite sides of a dwelling barrier by means of screws or bolts (not shown)

received in attachment holes 12 provided for such purpose. The dwelling contemplated may include a home, kennel, doghouse or the like. The barrier which forms a part of the dwelling may include a wall, door, window or the like.

Along the vertical interior edges of the first frame border 10 are integrally joined a pair of vertical side wings 14 & 15 which extend inwardly toward the second frame border 11. The vertical height of the side wings 14 & 15 correspond to the vertical height of the rectangular opening in the frame border 10. As illustrated in FIG. 3 the width of the side wings 14 & 15 may be varied to correspond to the thickness of the barrier in which the pet door is to be installed. Alternatively, the side wings 14 & 15 may be constructed as telescoping side walls to accommodate a range of barrier thicknesses. Along the upper and lower horizontal interior edges of the second frame border 11 are integrally joined a pair of top and bottom wings 16 & 17 which extend inwardly toward the first frame border 10. The horizontal length of the top and bottom wings 16 & 17 correspond to the horizontal dimension of the rectangular opening in the frame border 11. As illustrated in FIG. 3 the width of the top and bottom wings 16 & 17 may be varied to correspond to the thickness of the barrier in which the pet door is to be installed. Alternatively, the top and bottom wings 16 & 17 may be constructed as telescoping top and bottom walls to accommodate a range of barrier thicknesses.

Accordingly, when properly installed and aligned within an opening through the dwelling barrier, the side wings 14 & 15 and the top and bottom wings 16 & 17 frame a rectangular portal through the barrier between the first and second frame borders 10 & 11.

Received within said rectangular portal defined by the side wings 14 & 15 and the top and bottom wings 16 & 17 is a movable closure door generally referenced by the number 18. The closure 18 includes a pair of spaced apart, closure panels 20 & 21 secured to top and bottom edge members 22 & 23 and to spaced apart side edge members 24 & 25 as by means of rivets 19 or the like. Thus, the panels 20 & 21 and edge members 22–25 define a volumetric space which is filled with insulation 26 as illustrated in FIG. 2.

Figure 2:
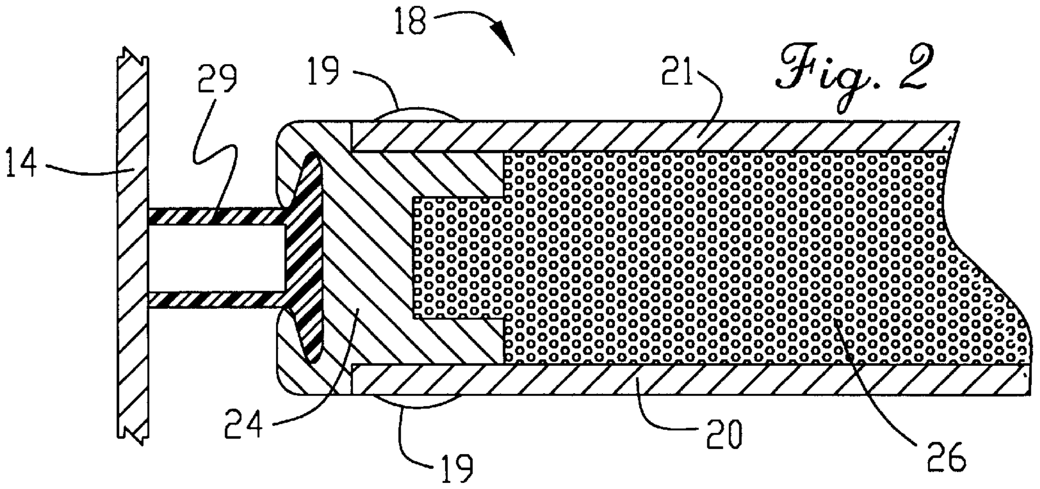
FIG. 2 is an enlarged fragmentary view taken along line 2—2 of FIG. 1 in the directions of the arrows.

Within a peripheral gasket channel as illustrated in FIG. 2, the top and bottom edge members 22 & 23 and side edge members 24 & 25 each correspondingly receive top, bottom and side wiper seals 27–30. The seals 27–30 are fabricated from a resiliently flexible material to engage and seal with the side, top and bottom wing panels 14–17 which define the rectangular portal through the barrier. The seals 27–30 are preferably formed as deformable double wiper blades as illustrated to insure that at least one blade is in contact with its corresponding side, top or bottom wing panel 14–17 in the event the closure 18 is slightly canted from a perfect vertical orientation within the rectangular portal to positively and effectively provide a continuous seal around the entire perimeter of the closure 18.

The movable closure door 18 is suspendingly carried on a pivot rod 31 mounted in holes of the side wings 14 & 15 and connected by means of a washer 32 and cotter pin 33 on each end. More particularly, the pivot rod 31 penetrates the side edge members 24 & 25 and extends outwardly between the spaced apart blades of the side wiper seals 29 & 30 so as to be positioned with a pivot axis lying in the centermost plane bifurcating the thickness of the closure 18. Vertically, the pivot rod 31 is positioned between the top edge and the lateral midline of the closure to provide a pendulum-like swing of the closure 18 within the rectangular portal.

Figure 6:
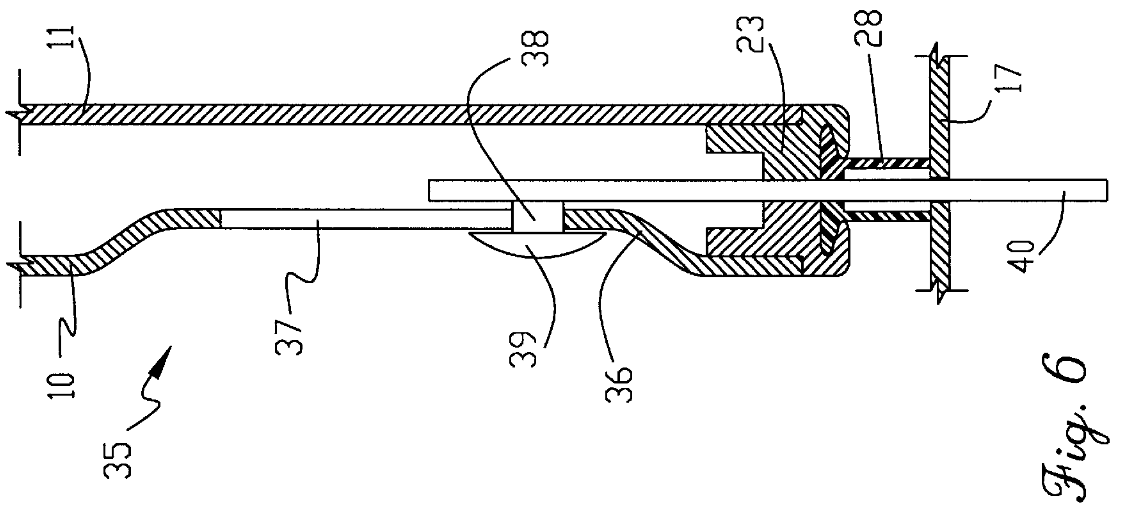
FIG. 6 is an enlarged side sectional view of the latch similar to FIG. 5, except showing the latch moved to the lock position.
Figure 5:
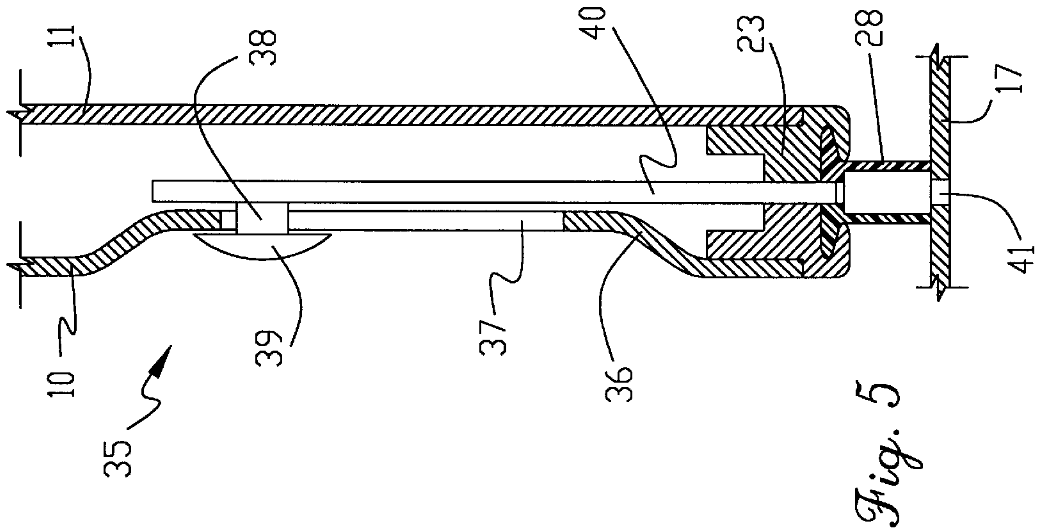
FIG. 5 is an enlarged side sectional view of the latch moved to the unlock position thereof.
Figure 4:
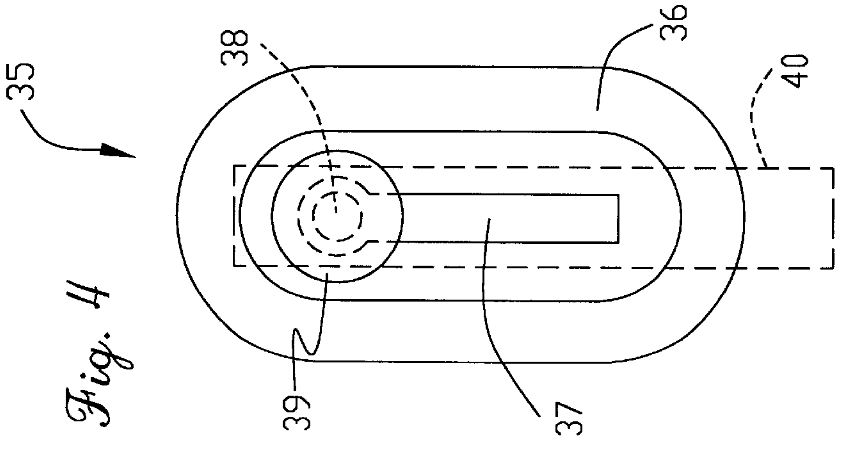
FIG. 4 is a front elevational view of the latch for the pet door.

The pet door also optionally includes a latch mechanism referenced generally by the numeral 35. The details of construction are illustrated in FIGS. 4–6. Within an oblong recess 36 formed in the closure panel 20 is an elongate slot 37 which slidably receives a slide post 38. A finger button 39 is fixed to the end of the slide post 38 within the recess 36. The opposite end of the post 38, within the closure door 18, is secured to a slide tang 40, the lower end of which is received within an opening in the bottom edge member 23 that corresponds to the cross sectional shape of the tang 40. As shown in FIG. 5 in the unlock position of the latch mechanism 35, the button 39, slide post 38 and tang 40 are positioned near the uppermost end of the slot 27 such that the tang 40 is received within the closure 18. The bottom wing panel 17 has a keyhole 41 therein which generally corresponds to the cross sectional shape of the tang 40. Thus, as shown in FIG. 6 in the lock position of the latch mechanism 35, the button 39, slide post 38 and tang 40 are positioned near the lowermost end of the slot 37 such that the tang 40 extends from the closure 18 between the spaced blades of the wiper seal 28 to be received in the keyhole 41 of the bottom wing panel 17 to thereby prevent swinging movement of the closure door 18.

Alternatively, the latch mechanism 35 may be rotated 90° from the orientation illustrated in FIG. 1 such that the end of the slide tang 40 is received within an opening in the side edge member 25 that corresponds to the cross sectional shape of the tang 40 and which may be extended into the keyhole 41 of the side wing panel 15 to thereby prevent movement of the closure door 18.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Numerals first frame border 10
second frame border 11
attachment holes 12
vertical side wings 14 & 15
top and bottom wings 16 & 17
closure 18
- closure panels 20 & 21
- top and bottom edge members 22 & 23
- side edge members 24 & 25
- rivets 19
- insulation 26 top wiper seal 27
bottom wiper seal 28
side wiper seals 29 & 30
pivot rod 31
- washer 32
- cotter pin 33 latch mechanism 35
- oblong recess 36
- elongate slot 37
- slide post 38 finger button 39 slide tang 40 keyhole 41

I claim:

1. A pet door for installation in an opening through a dwelling barrier, said pet door comprising:

a frame support connected to said dwelling barrier and providing a rectangular passageway through said opening in said barrier;

a movable closure having a pair of spaced apart, closure panels secured to top and bottom edge members and to spaced apart side edge members, said closure being slightly smaller in height and width than said rectangular passageway of said frame support, and being substantially filled with insulation within the space defined by said closure panels and said edge members;

a resiliently flexible seal connected to said top, bottom and side edge members to movably and sealably engage said rectangular passageway of said frame support, said flexible seal including deformable double wiper blades with each said blade spaced apart from the midline of said edge members to contact said passageway of said frame support; and a pivot axle connecting said movable closure intermediate the top and bottom thereof to said frame support, said pivot axle being disposed through said flexible seal between said spaced apart blades of said double wiper blades;

whereby said closure may be influenced to swing inwardly and outwardly within said passageway on said pivot axle and, when at rest, said flexible seal contacts said passageway around the entire perimeter of said closure.

2. The pet door as in claim 1, said frame support including:

a first frame secured to a first side of said dwelling barrier around the perimeter of said opening therethrough adjacent said rectangular passageway; and a second frame secured to a second side of said dwelling barrier around the perimeter of said opening therethrough opposite said first frame and adjacent said rectangular passageway.

3. The pet door as in claim 2, said frame support further including:

a pair of spaced apart, parallel vertical panels secured to said first frame and extending through said opening in said barrier, said vertical panels having a width substantially corresponding to the thickness of said barrier; and a pair of spaced apart, parallel horizontal panels secured to said second frame and extending through said opening in said barrier, said horizontal panels having a width substantially corresponding to the thickness of said barrier, whereby said vertical and horizontal panels define said rectangular passageway through said opening in said barrier.

4. The pet door as in claim 1 further comprising a latch selectively movable to a lock position to prevent movement of said closure on said pivot axle and to an unlock position to permit swinging movement of said closure on said pivot axle.

5. The pet door as in claim 4 said frame support having a keyhole therein and said latch further comprising an extendable tang to be received in said keyhole of said frame support to prevent movement of said closure on said pivot axle.

* * * * *